(12) United States Patent
Gulick et al.

(10) Patent No.: US 7,210,009 B2
(45) Date of Patent: Apr. 24, 2007

(54) COMPUTER SYSTEM EMPLOYING A TRUSTED EXECUTION ENVIRONMENT INCLUDING A MEMORY CONTROLLER CONFIGURED TO CLEAR MEMORY

(75) Inventors: Dale E. Gulick, Austin, TX (US); Geoffrey S. Strongin, Austin, TX (US); William A. Hughes, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 312 days.

(21) Appl. No.: 10/654,734

(22) Filed: Sep. 4, 2003

(65) Prior Publication Data

US 2005/0055524 A1 Mar. 10, 2005

(51) Int. Cl.
*G06F 12/12* (2006.01)
*G06F 12/16* (2006.01)

(52) U.S. Cl. .................. 711/159; 711/156; 713/193
(58) Field of Classification Search ............ None
See application file for complete search history.

(56) References Cited

U.S. PATENT DOCUMENTS

| | | | |
|---|---|---|---|
| 5,987,604 A | 11/1999 | Edrich | |
| 6,327,652 B1 | 12/2001 | England et al. | |
| 6,330,670 B1 | 12/2001 | England et al. | |
| 6,854,046 B1 | 2/2005 | Evans et al. | |
| 6,922,783 B2 * | 7/2005 | Knee et al. ................. 713/320 |
| 6,925,627 B1 * | 8/2005 | Longway et al. ............. 716/13 |
| 6,938,164 B1 * | 8/2005 | England et al. ............. 713/193 |

| | | | |
|---|---|---|---|
| 2002/0003673 A1 | 1/2002 | Narin | |
| 2002/0087816 A1 * | 7/2002 | Atkinson et al. ........... 711/156 |
| 2003/0084346 A1 | 5/2003 | Kozuch et al. | |
| 2003/0154392 A1 * | 8/2003 | Lewis ...................... 713/200 |

(Continued)

FOREIGN PATENT DOCUMENTS

EP 1069495 7/2000

(Continued)

OTHER PUBLICATIONS

Gehringer, et al, "Fast Object-Oriented Procedure Calls: Lessons from the Intel 432", ACM Sigarch Computer Architecture News, Proceedings of the 13th Annual International Symposium on Computer Architecture, vol. 14, No. 2, Jun. 20, 1986, pp. 92-101, XP002302883, Los Alamitos, CA.

(Continued)

*Primary Examiner*—Kevin L. Ellis
*Assistant Examiner*—Duc T Doan
(74) *Attorney, Agent, or Firm*—Meyertons Hood Kivlin Kowert & Goetzel, P.C.; B. Noël Kivlin; Stephen Curran

(57) ABSTRACT

A computer system includes a processor which may initialize a secure execution mode by executing a security initialization instruction. Further, the processor may operate in the secure execution mode by executing a secure operating system code segment. The computer system also includes a system memory configured to store data in a plurality of locations. The computer system also includes a memory controller which may selectively clear the data from a programmed range of the memory locations of the system memory when enabled in response to a reset of the processor.

16 Claims, 3 Drawing Sheets

U.S. PATENT DOCUMENTS

2003/0200402 A1  10/2003  Willman et al.
2003/0200405 A1  10/2003  Willman et al.
2004/0148536 A1* 7/2004   Zimmer et al. ............. 713/323

FOREIGN PATENT DOCUMENTS

EP          1209563        11/2001

OTHER PUBLICATIONS

Clark, et al, "Bits: A Smartcard Protected Operating System", Communications of the Association for Computing Machinery, Association for Computing Machinery, New York,, NY, vol. 37, No. 11, Nov. 1, 1994, pp. 66-70, XP000485634.

International search report application No. PCT/US2004/018043 mailed Nov. 18, 2004.

"Microsoft Scheme for PC Security Faces Flak", Merritt, *EE Times,* www.eet.com, Jul. 15, 2002.

U.S. Appl. No. 10/419,082, filed Apr. 18, 2003.
U.S. Appl. No. 10/429,132, filed May 2, 2003.
U.S. Appl. No. 10/419,085, filed Apr. 18, 2003.
U.S. Appl. No. 10/419,086, filed Apr. 18, 2003.
U.S. Appl. No. 10/419,084, filed Apr. 18, 2003.
U.S. Appl. No. 10/419,038, filed Apr. 18, 2003.
U.S. Appl. No. 10/419,083, filed Apr. 18, 2003.
U.S. Appl. No. 10/419,090, filed Apr. 18, 2003.
U.S. Appl. No. 10/419,121, filed Apr. 18, 2003.
U.S. Appl. No. 10/419,091, filed Apr. 18, 2003.
U.S. Appl. No. 10/419,122, filed Apr. 18, 2003.
U.S. Appl. No. 10/419,120, filed Apr. 18, 2003.

* cited by examiner

COMPUTER SYSTEM EMPLOYING A TRUSTED EXECUTION ENVIRONMENT INCLUDING A MEMORY CONTROLLER CONFIGURED TO CLEAR MEMORY

BACKGROUND OF THE INVENTION

1. Field of the Invention

This invention relates to computer systems and, more particularly, to computer systems employing a trusted execution mode for protecting data stored within the computer system memory from unauthorized access.

2. Description of the Related Art

Modern computer systems are revolutionizing the way people live. This is particularly true for system platforms including microprocessors employing the x86 system architecture. The openness of x86-based systems to a myriad of owner-installable third-party peripheral devices and applications has enabled a broad marketplace of hardware and software vendors that has fostered competition, innovation, and evolution. An example of such evolution is the now widespread use of the platform as a digital communication and media system of ever-increasing quality and capability. In concert with the Internet, these system platforms are clearly revolutionizing mass distribution of digital content, allowing on-demand access to newspapers, real-time weather conditions and radio stations from around the world, on-line banking and shopping, and audio and video-based entertainment.

Since the x86 platform is an open architecture, devices typically have vendor-supplied drivers which run in Kernel mode in order to access the devices, and certain software applications may include Kernel mode components. Thus, although the open architecture may have advantages and may still provide a large degree of protection against accidental interference of one application with another, the current architectural protection mechanisms may be exposed in this environment to unwanted manipulation.

Computer systems including microprocessors employing the x86 architecture include features designed to protect against applications interfering with each other. For example, x86-based operating systems rely on two features of the x86 Protected mode architecture to provide an environment where applications are isolated from each other, and critical operating system code and data is isolated from applications: 1) paged virtual memory, and 2) execution privilege level.

Paged virtual memory allows the Operating System (OS) to define a separate virtual address space for each application, and to selectively map individual pages of physical memory into each of those virtual address spaces through a set of address translation tables. This provides each application with its own private section of physical memory for code and data that may be inaccessible to other applications. The virtual memory mechanism may also allow the OS to selectively map pages of physical memory into multiple virtual address spaces, and to selectively designate such pages in virtual space as read-only. This shared mapping capability may also allow a copy of the OS Kernel itself to reside in each application's address space, and may likewise allow shared mappings of peripheral device access ports and associated device driver routines, thus providing applications with efficient access to OS services without requiring costly address space switches. But the OS portion of the address space necessarily includes system data areas that OS code must be able to modify, and which must still be protected from application code. The read-only designation may not provide proper protection for such areas.

The x86 architecture also defines four privilege levels, 0 through 3, which are assigned to regions of code by the OS and kept in code segment descriptors. Typically, the privilege level of currently executing code or procedure will be stored as the Current Privilege Level (CPL). Thus the privilege levels are commonly referred to as CPL0 through CPL3. Using these privilege levels, certain system resources are accessible only to code executing at the proper level. The paged virtual memory architecture may allow access to pages of virtual memory to be restricted by privilege level. Although four privilege levels are defined, only the CPL0 and CPL3 levels are typically used by mainstream operating systems because the paged virtual memory architecture does not distinguish CPL1 or CPL2 from CPL3. CPL0 is commonly referred to as Kernel mode and is the most privileged level, while CPL3 is commonly referred to as User mode and is the least privileged level. OS code and data are typically assigned to CPL0 while application code and data are assigned to CPL3. CPL0 execution privilege does not override read-only protection; the two attributes are independent. Code segment descriptors are used to assign these levels.

In addition to this memory protection, all processor control registers, including those that control virtual memory operation, are by architectural definition accessible only at CPL0. In addition, special control transfer instructions are typically required to switch execution from one segment to another, and hence to switch privilege levels. These instructions allow the OS to limit the targets of such control transfers to specific entry points in OS-controlled code, hence an application may not change privilege level without simultaneously handing control over to the OS.

The isolation of address spaces from each other, and of OS memory from applications, may be completely controlled by the contents of the virtual memory address translation tables. The translation tables define the virtual-to-physical page mappings that isolate one application's memory from another's, and also the read-only and privilege level attributes that protect shared libraries and the OS. The tables themselves are memory-resident data structures, and contain translation entries that map them into the shared OS memory area and restrict access to them to Kernel mode code.

The existing protection mechanisms would seem to provide adequate protection for applications and the operating system. In a well-behaved system, (e.g. correct application of these mechanisms by the operating system, and correct operation of the OS code that controls these mechanisms, and that all other code which runs in Kernel mode does not interfere with this) they do. However, typical x86-based systems include such a large amount of Kernel-mode code, not just from the OS vendors but from many independent sources, that it may be impossible for anyone to assure that such interference, whether accidental or otherwise cannot occur.

This may be particularly true for the contents of physical memory. For example, when the contents of a given location in memory are no longer needed by an application, the location is typically deallocated. However, the actual data stored at that location may still be intact. Depending on the type of operation that a user is performing and the type of software application that is running, information stored within memory may be vulnerable to outside access. Thus, it may be desirable to improve security and thereby possibly make x86 architecture systems less vulnerable to such access.

SUMMARY OF THE INVENTION

Various embodiments of a computer system employing a trusted execution environment and configured to clear memory are disclosed. In one embodiment, the computer system includes a processor which may be operate in a secure execution mode by executing a secure operating system code segment. The computer system also includes a system memory including a plurality of locations for storing data. The computer system further includes a memory controller coupled to the system memory. The memory controller may selectively clear the data in a programmed range of the plurality of locations of the system memory when enabled in response to a reset of the processor.

In one specific implementation, the memory controller may determine whether the processor was in a suspend to RAM state prior to the reset. Further, the memory controller may clear the data in response to determining that the processor was not in a suspend to RAM state prior to the reset.

Figure 1:
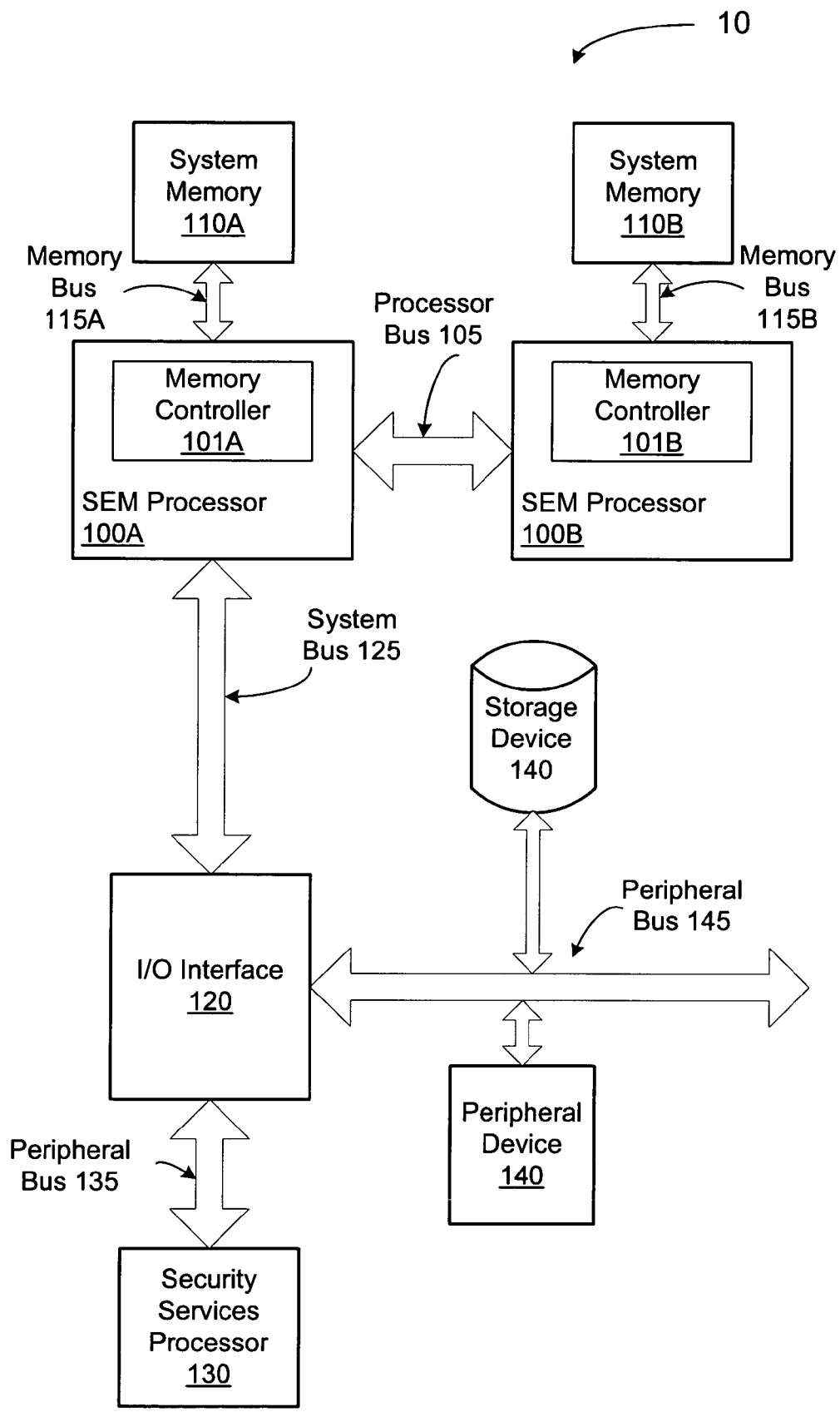
FIG. 1 is a block diagram of one embodiment of a computer system employing a trusted computing platform.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Overview of a Secure/Trusted Computing Platform

Trusted computing enables computer system (e.g., personal computer (PC)) users to participate in new activities such as downloading electronic cash and movies while at the same time being protected from attacks on their privacy. To be part of a trusted computing environment, the PC itself must be trusted by both the user and outside entities such as banks and content providers, for example. Critical elements which may be necessary to create a trusted PC include: a trusted processing environment, platform-specific secrets, cryptographic processing, secure storage and a secure operating system code segment referred to as a Security Kernel (SK). The building blocks to implement these elements will be described in greater detail below.

Processors configured to execute x86 instructions generally include architectural features such as Protected mode, which provides for paged virtual memory and privileged execution modes, and the set of control registers which controls these features. Controlling access to those control registers and page tables may provide additional protection from unauthorized access to program code and data within a computer system. Thus, adding a set of architectural extensions to such processors and corresponding software support may provide this protection. The overall security enhancements to a processor may be referred to as a Secure Execution Mode (SEM). Secure Execution Mode (SEM) is a new operating mode added to a processor that creates a trusted execution environment in which a Security Kernel can run free from external tampering.

Accordingly, a processor capable of operating in SEM may include security hardware (not shown) which, when enabled by SEM, provides support for SEM operating modes such as a trusted execution (TX) mode of operation, for example. The trusted execution mode may include, depending on what software is executing and its privilege level, the SEM-capable processor operating in a secure user mode and a secure kernel mode in addition to the normal user mode and normal kernel mode. Mechanisms may also be provided to create a protected memory region that may only be accessible by software running within this environment as well as from hardware memory accesses (e.g., direct memory access (DMA)).

The new Trusted Execution environment (TX) is somewhat analogous to the traditional normal/protect mode (Ring 3/Ring 0) mechanism used to separate User and Kernel environments. Thus, an SEM-capable CPU contains the hardware mechanisms that create and enforce the TX mode.

It is noted that the latest revision of the Advanced Configuration and Power Interface (ACPI) specification defines various operational and sleep states of the system. One such sleep state is the S3 state, which is sometimes referred to as the Suspend to Ram state. The S3 state is defined as a low wakeup latency sleep state, where all system context is lost except for system memory. Upon entering the S3 state, power is removed from most system devices. However, devices such as a memory controller which support system memory, may be partially powered.

ACPI System Management may in large part be orthogonal to trusted computing and the trusted environment. However, moving from one S-state to another may have consequences. For example, as described above, part of the process of initializing the trusted environment is clearing the contents of physical memory when the processor comes out of reset. If, however the system is coming out of the S3 state, the memory should not be cleared. Similarly, secrets present in trusted memory cannot be stored "in the clear" on the hard disk when the system is placed in other sleep states such as the S4 state, for example.

Computer System Employing a Trusted Computing Platform

Turning now to FIG. 1, a block diagram of one embodiment of a computer system employing a trusted computing platform is shown. Computer system 10 includes two SEM capable processors designated SEM processor 100A and SEM processor 100B. SEM processor 100A is coupled to SEM processor 100B via a processor bus 105. Computer system 10 also includes a system memory 110A which is coupled to SEM processor 100A and a system memory 10B which is coupled to SEM processor 100B. SEM processor 100A is coupled to an I/O interface 120 via a system bus 125. I/O interface 120 is coupled to a storage device 140 and to a peripheral device 150 via a peripheral bus 145. I/O interface 120 is further coupled to SSP 130 via peripheral bus 135. In an alternative embodiment, instead of peripheral bus 135, SSP 130 may be coupled to peripheral bus 145 as indicated by the dotted lines. It is noted that although two SEM processors are shown, other embodiments may include other numbers of SEM processors. It is also noted that components having the same reference number and a letter may be referred simply to by the reference number alone. For example, SEM processor 100A may be referred to simply as SEM processor 100 where appropriate.

In one embodiment, processor bus 105 may be a coherent link which may form a high-speed point-to-point link which is compliant with the HyperTransport™ specification. Similarly, in one embodiment, system bus 125 may be a non-coherent I/O link. For example, system bus 125 may also be a high-speed point-to-point link which may be compatible with the HyperTransport™ I/O specification. In such embodiments, SEM processor 100A may include integrated host bridge logic (not shown) for connection to the non-coherent link and for conveying messages between SEM processor 100A and SEM processor 100B upon the coherent link. It is noted however, that in other embodiments, system bus 125 may be any type of system bus such as a front side bus (FSB) for example.

In the illustrated embodiment, SEM processor 100A and SEM processor 100B each include an integrated memory controller 101A and 101B for connection to system memories 110A and 110B, respectively. It is noted that in alternative embodiments, I/O interface 120 may include one or more memory controllers and a host bridge. In such embodiments, system memories 110 may be connected to I/O interface 120.

SEM processor 100 is illustrative of a processor employing the x86 architecture. For example, in one embodiment, SEM processor 100 may be an Athlon™ processor by Advanced Micro Devices, Inc. As such, SEM processor 100 is configured to execute x86 instructions which may be stored in system memory 110 or storage device 140. In the illustrated embodiment, SEM processor 100 includes security hardware within memory controller 101 (not shown) that, when enabled by SEM, provides support for SEM operating modes such as the trusted execution (TX) mode described above in conjunction with the description of FIG. 1, for example.

System memory 110 is configured to store program instructions and data that is frequently used by SEM processor 100. In a typical system configuration, storage device 140 may be used to more permanently store the program instructions and data and as SEM processor 100 needs the data and program code, it may be transferred to system memory 110. Additional support for SEM operating modes may be provided by the security kernel which may be executed in conjunction with the OS out of system memory 110 during operation of SEM processor 100. In addition, system memory 110 may be partitioned into a trusted portion and an untrusted portion. The security kernel resides in the trusted portion of system memory 110. As described above, system memory 110 is typically accessed using paged virtual memory. In such an arrangement, system memory 110 may be accessed by individual pages or chunks of memory. This paging function is typically handled by OS memory management functions. Further, as memory locations are allocated and deallocated, the data stored in the deallocated memory locations may still be accessible.

In one embodiment, system memory 110 may be implemented using a plurality of memory chips implemented in dynamic random access memory (DRAM) technology or in one of the varieties of DRAM technologies available, such as synchronous DRAM (SDRAM), for example. The DRAM chips are typically mounted on small circuit boards having an edge connector which are inserted into a socket connector on a motherboard. Depending on the configuration of the boards, they may be referred to as either single or dual in-line memory modules (e.g. SIMMs or DIMMs, respectively). System memory 110 may include multiple banks of memory modules which may allow memory expansion.

As described above, storage device 140 may store program code and data. In one embodiment, storage device 140 may be a hard disk drive or a bank of hard disk drives, although other embodiments are contemplated that include other mass storage devices such as CD-ROM drives, floppy disk drives and tape drives, for example.

Peripheral device 150 may be any peripheral device such as a modem, video capture device or other general purpose input output device, for example. It is noted that in other embodiments, other numbers of peripheral devices may be used.

I/O interface 120 may be configured to provide bus control and translation for transactions between different peripheral buses and SEM processors 100A and 1001B during normal system operation. In one embodiment, I/O interface 120 includes a bus bridge (not shown) which may perform functions associated with a Northbridge. For example, peripheral bus 145 may be a peripheral component interconnect (PCI) bus and peripheral bus 135 may be a low pin count (LPC) bus. In addition, the bus bridge may be configured to provide security mechanisms (not shown) which may allow non-spoofable communication to occur between SEM processor 100 and SSP 130 during a secure initialization Generally speaking, the Security Kernel Initialization instruction (SKINIT) executes on SEM-capable processors such as SEM processor 100A and SEM processor 100B, for example. In one embodiment, the SKINIT instruction may include three execution phases: Initialization, Data Transfer and Jump.

During the initialization phase, SEM processor 100A state may be reset and any microcode patches may be cleared. In addition, as will be described in greater detail below, memory controllers 101A and 101B, whether integrated or external to SEM processor 100 may include logic (not shown in FIG. 2) configured to cause the physical contents of the memory chips of system memory 110 to be overwritten in response to certain system conditions, such as a reset.

Figure 2:
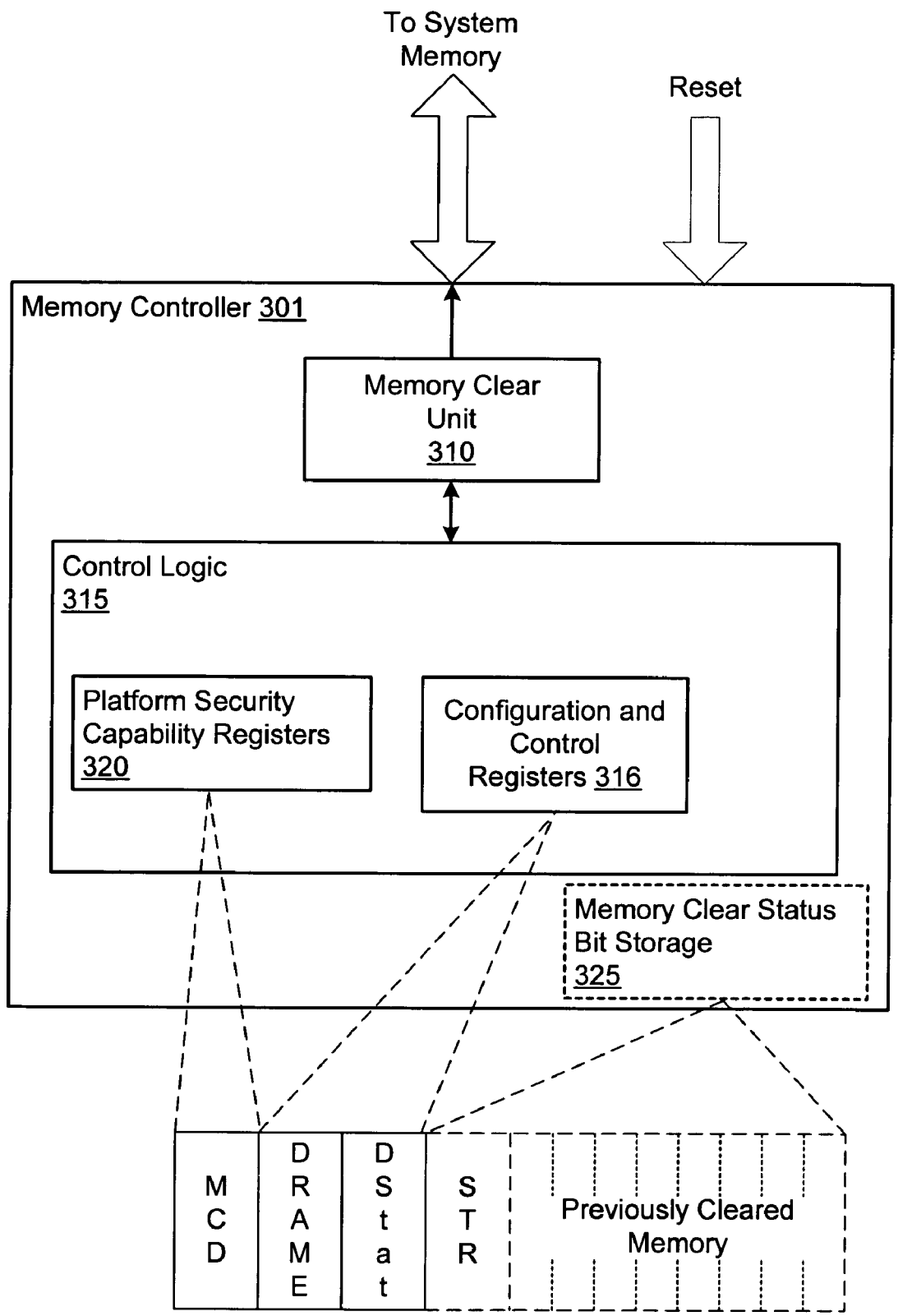
FIG. 2 is a block diagram of one embodiment of a memory controller of a computer system employing a trusted computing platform.

Referring to FIG. 2, a block diagram of one embodiment of a memory controller is shown. Memory controller 301 includes control logic 315 coupled to a memory clear status bit storage 325 and to a memory clear unit 310. Memory controller 301 may be coupled to a system memory such as system memory 110 of FIG. 1, for example.

Memory controller 301 may be configured to clear the contents of the memory chips of system memory 110 in response to a reset or power-up sequence, unless the reset or power-up is associated with a Suspend To RAM action. As used herein, clearing the contents of the memory chips refers to causing the data stored within the memory chips of the system memory to be overwritten and thus unusable. In one embodiment, memory controller 301 may clear the contents of the memory chips by writing a logic value of zero to every location in system memory which it has been programmed to access. In another embodiment, memory controller 301 may clear the contents of the memory chips by writing a logic value of one to every location in system memory which it has been programmed to access. In yet another embodiment, memory controller 301 may clear the contents of the memory chips by writing some other data pattern to system memory 110 which may render any data previously stored there unusable. In such an embodiment, the data pattern may be randomly generated.

It is noted that in one embodiment, memory controller 301 may be integrated within SEM processor 100 such as memory controller 101 of FIG. 1 or in an alternative embodiment memory controller 301 may be external to SEM processor 100, in which case memory controller 301 may be part of a bridge unit such as I/O controller 120 of FIG. 1, for example.

In the illustrated embodiment, control logic 315 includes configuration and control registers 316 and platform capability registers 320. Configuration and control registers 316 may include software accessible registers for programming the size of addressable memory. For example, during initialization, BIOS may determine the size of the usable system memory and subsequently program memory controller 301 to access that usable memory by programming configuration and control registers 316. In addition, configuration and control registers 316 may include a dynamic random access memory (DRAM) enable bit designated the DRAME bit. In one embodiment, the DRAME bit may be set to a logic value of zero by reset and may be set to a logic value of one by software such as BIOS, for example, as the last step in programming the memory controller 301. Hardware may also clear this bit when the memory controller is disabled or turned off. When set, the DRAME bit causes memory controller 301 to transition from disabled to enabled. Further, configuration and control registers 316 may include a DRAM status bit designated the DStat bit. In one embodiment, the DStat bit is software visible. The zero to one transition of this bit indicates that a memory clear operation has completed. The bit may be set to one by hardware in control logic 315 when the memory clear operation completes. The DStat bit may be cleared when the DRAME bit is cleared. For example, DStat=1 if DRAME is true AND memory clear unit 310 is not in a memory clearing operation.

In the illustrated embodiment, memory clear unit 310 is configured to clear the area of system memory which has been programmed into configuration registers 316 when memory controller 301 transitions from disabled to enabled and memory clear unit 310 is enabled. For example, in one embodiment, memory clear unit 310 may include the logic for generating the data writes to system memory during the memory clear operation.

In the illustrated embodiment, platform security capability registers 320 includes a memory clear disable bit designated MCD. As will be described in greater detail below, the MCD bit may be configured to enable and disable memory clear unit 310 thereby enabling and disabling clearing of system memory.

In one embodiment, platform security capability registers 320 are software visible access-protection registers which are located in a configuration space associated with memory controller 301. It is noted that the MCD bit may be visible only to trusted software. Addressing may be based on a New Capability Pointer (0Fh). The MCD bit may be one bit of a direct memory access exclusion vector (DEV) control register. In one embodiment, when the MCD bit is set to a logic one, memory clear unit 310 is disabled and when the MCD bit is set to a logic zero, memory clear unit 310 is enabled. Further, the MCD bit may not be writable unless memory is enabled.

It is noted that in one embodiment, the state of the MCD bit may be retained whenever the system power is removed but the memory chips of system memory remain powered (e.g., S3 state). To retain bit state information, the MCD bit may have an associated Suspend To Ram bit, designated STR, which retains state and may work in a master/slave arrangement with the MCD bit. In one embodiment, at power up, the state of the STR bit is copied into the MCD bit. Thus, the STR bit is indicative of whether contents of the system memory have been saved during a power down. The STR bit may not be software visible and may not be cleared by reset. In one embodiment, the STR bit retains state whenever the system power is removed but the memory chips of system memory remain powered (e.g., S3 state). Once memory controller 301 is enabled, trusted software may indirectly set the STR bit by setting the MCD bit prior to entering the S3 state. Prior to entering a power-down condition, the state the MCD bit may copied to the STR bit. The STR bit may be cleared automatically when the DRAME bit becomes set (e.g., after the memory clear operation evaluates its state). In the illustrated embodiment, the STR bit may be include in memory clear status bit storage 325.

In the illustrated embodiment, memory clear status bit storage 325 also includes Previously Cleared Memory bits. These bits may store an indication of which portions of memory have been cleared by the previous memory clear operation. These bits are not software visible and may not be cleared by reset. In one embodiment, the Previously Cleared Memory bits retain state whenever the system power is removed but the memory chips of system memory remain powered (e.g., S3 state). The Previously Cleared Memory bits may be reloaded each time the memory clear operation is performed.

In one embodiment, control logic 315 may check the current size of the system memory which has been programmed into memory controller 301 against the state stored within the Previously Cleared Memory bits. If there is a mismatch, memory clear unit 310 may unconditionally clear system memory as described above. For example, malicious BIOS or BIOS emulation software may have programmed memory controller 301 to access a smaller area of memory than was previously accessed and cleared in an attempt to access secure memory. Thus, when a mismatch is detected, the entire previously cleared memory range is cleared. In one embodiment, the Previously Cleared Memory bits may be implemented to store the upper address bits of the highest 64M-byte block of memory cleared by the last memory clear operation. However, in other embodiments, other implementations are contemplated.

In one embodiment, the bits of memory clear status bit storage 325 which retain state whenever the system power is removed but the memory chips of system memory remain powered (e.g., S3 state) may be stored in state storage elements implemented in the I/O pad ring of the device housing the memory controller (as shown in the dotted lines). As will be described in greater detail below in conjunction with the description of FIG. 3, the control logic 315 of memory controller 301 may have access to these state storage elements when coming out of reset. Since power may remain on for certain devices (e.g. volatile storage such as RAM) even during certain system power down conditions (e.g., the S3 state). These state storage elements may retain their state through a power-down and subsequent power-up sequence.

Figure 3:
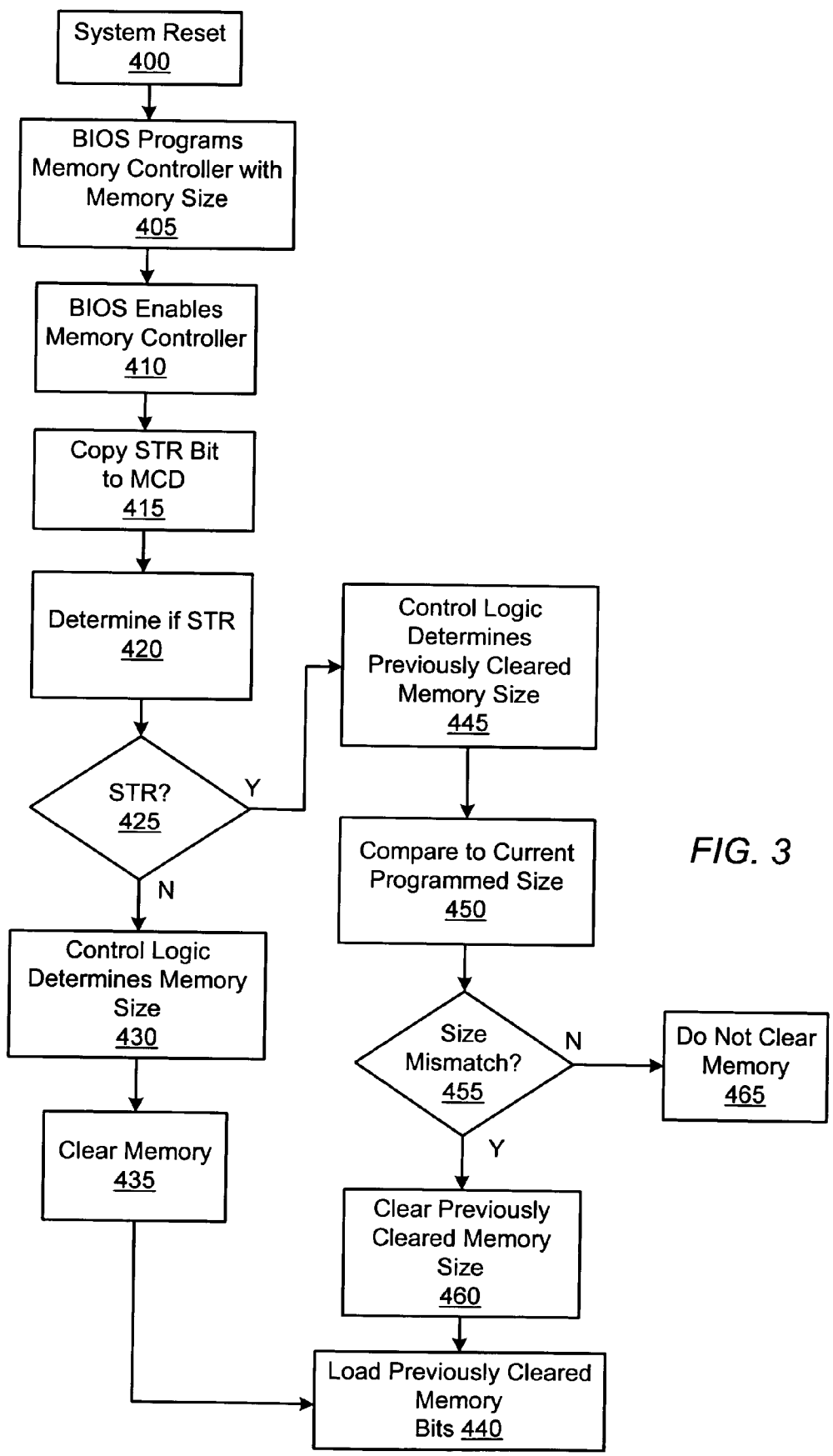
FIG. 3 is a flow diagram describing the operation of one embodiment of a memory controller of a computer system employing a trusted computing platform.

FIG. 3 illustrates a flow diagram describing the operation of one embodiment of a memory controller in a trusted computing platform. Referring collectively to FIG. 2 and FIG. 3, operation begins in block 400 where a system reset occurs. In response to the reset, BIOS performs various system level set-up and configuration tasks. For example, BIOS must enable system memory by configuring memory controller 301. Depending on the specific system implementation, BIOS may perform one or more memory tests to determine the physical size of the system memory. Once the available memory has been determined, in one embodiment, BIOS programs one or more configuration registers 316 of memory controller 301 with the current size of the available memory (block 405). Once the memory controller is programmed, BIOS may enable memory controller 301 by setting the DRAME bit (block 410). Memory controller 301 then transitions from disabled to enabled. The STR bit is copied to the MCD bit by control logic 315 (block 415).

In response to the transition from disabled to enabled, control logic 315 reads the MCD bit to determine whether the system was in an S3 state (e.g., Suspend to Ram) prior to the reset (block 420). If the system was not in an S3 state (e.g., MCD bit clear), then control logic 315 determines the memory size from the value stored in configuration registers 316 (block 430). Control logic 315 notifies memory clear unit 310 to perform a memory clear operation of all locations that are within the current programmed memory size (block 435). The size of the memory that is cleared is saved in the Previously Cleared Memory bits (block 440).

Referring back to block 425, if the control logic 315 determines that the system was in an S3 state (e.g., MCD bit set), then control logic 315 determines the currently programmed memory size from the value stored in configuration registers 316 and the previously cleared memory size by reading the value stored within the Previously Cleared Memory bits of memory clear status bit storage 325 (block 445). Control logic 315 compares the currently programmed memory size to the previously cleared memory size (block 450). If there is a size mismatch (block 455), control logic 315 notifies memory clear unit 310 to perform a memory clear operation of all locations that were cleared in the previous memory clear operation as indicated by the value stored within the Previously Cleared Memory bits of memory clear status bit storage 325 (block 460). The size of the memory that is cleared is saved in the Previously Cleared Memory bits (block 440). In one embodiment, once the MCD bit has been evaluated, the STR bit may be cleared, which may cause the memory clear operation to be enabled upon coming out of reset.

Referring back to block 455, if the currently programmed memory size is the same as the previously cleared memory size, the memory clear operation will not be performed since memory clear unit 310 is disabled by the set MCD bit (block 460).

In addition, as described above once memory controller 301 is enabled, the MCD bit may be set by trusted software before entering the S3 state, which may cause the memory clear operation to be disabled upon coming out of reset.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
a processor configured to operate in a secure execution mode by executing a secure operating system code segment;
a system memory coupled to said processor and including a plurality of locations for storing data; and
a memory controller coupled to said system memory and configured to selectively clear said data using a memory clear operation in a programmed range of said plurality of locations of said system memory when enabled in response to a reset of said processor;
wherein said memory controller is further configured to determine whether said processor was in a suspend to RAM state prior to said reset; and
wherein in response to determining that said processor was in a suspend to RAM state prior to said reset, said memory controller is further configured to determine whether a current programmed memory size is equal to a size of said programmed range of said plurality of locations cleared in a previous memory clear operation.

2. The computer system as recited in claim 1, wherein said memory controller is configured to clear said data using said memory clear operation in response to determining that said current programmed memory size is not equal to said size of said programmed range of said plurality of locations cleared in said previous memory clear operation.

3. The computer system as recited in claim 1, wherein said memory controller is configured to disable clearing of said data in response to determining that said current programmed memory size is equal to said size of said programmed range of said plurality of locations cleared in said previous memory clear operation.

4. The computer system as recited in claim 1, wherein said memory controller is manufactured on the same integrated circuit chip as said processor.

5. The computer system as recited in claim 4, wherein said memory controller includes a storage configured to store a bit indicative of whether said processor was in said suspend to RAM state prior to said reset.

6. The computer system as recited in claim 5, wherein said storage is a state storage element implemented as part of an input/output pad ring of said processor and wherein said state storage element retains state information during said suspend to RAM state of said computer system.

7. The computer system as recited in claim 4, wherein said memory controller includes a storage configured to store a plurality of bits indicative of said size of said programmed range of said plurality of locations cleared in a previous memory clear operation.

8. The computer system as recited in claim 7, wherein said storage is a state storage element implemented as part of an input/output pad ring of said processor and wherein said state storage element retains state information during said suspend to RAM state of said computer system.

9. The computer system as recited in claim 1, wherein said memory controller is manufactured on a different integrated circuit chip than said processor.

10. The computer system as recited in claim 9, wherein said memory controller includes a storage configured to store a bit indicative of whether said processor was in said suspend to RAM state prior to said reset.

11. The computer system as recited in claim 10, wherein said storage is a state storage element implemented as part of an input/output pad ring of said different integrated circuit chip and wherein said state storage element retains state information during said suspend to RAM state of said computer system.

12. The computer system as recited in claim 9, wherein said memory controller includes a storage configured to store a plurality of bits indicative of said size of said programmed range of said plurality of locations cleared in a previous memory clear operation.

13. The computer system as recited in claim 12, wherein said storage is a state storage element implemented as part of an input/output pad ring of said processor and wherein said state storage element retains state information during said suspend to RAM state of said system memory.

14. A method comprising:
   initializing a processor in a secure execution mode by executing a security initialization instruction and to operate in said secure execution mode by executing a secure operating system code segment:
   storing data within a plurality of locations of a system memory:
   selectively clearing said data using a memory clear operation in a programmed range of said plurality of locations of said system memory in response to a reset of said processor;
   determining whether said processor was in a suspend to RAM state prior to said reset; and
   in response to determining that said processor was not in said suspend to RAM state prior to said reset, determining whether a current programmed memory size is equal to a size of said programmed range of said plurality of locations cleared in a previous memory clear operation.

15. The method as recited in claim 14 further comprising clearing said data using said memory clear operation in response to determining that said current programmed memory size is not equal to said size of said programmed range of said plurality of locations cleared in a previous memory clear operation.

16. The method as recited in claim 14 further comprising disabling clearing of said data in response to determining that said current programmed memory size is equal to said size of said programmed range of said plurality of locations cleared in a previous memory clear operation.

\* \* \* \* \*